United States Patent [19]

Porta

[11] Patent Number: 5,207,997
[45] Date of Patent: May 4, 1993

[54] PROCESS FOR PRODUCING AN INORGANIC BARIUM-CONTAINING SOLIDS COMPOSITION

[75] Inventor: Jacopo Porta, Querceta, Italy

[73] Assignee: Kali-Chemie AG, Hanover, Fed. Rep. of Germany

[21] Appl. No.: 630,552

[22] Filed: Dec. 20, 1990

[30] Foreign Application Priority Data

Dec. 21, 1989 [DE] Fed. Rep. of Germany ....... 3942242

[51] Int. Cl.$^5$ .............................................. C01F 11/18
[52] U.S. Cl. .................................. 423/165; 501/141; 423/155; 423/430; 423/431; 423/432; 106/463
[58] Field of Search ............... 423/157, 165, 430, 431, 423/432, 155; 501/141, 147; 106/306, 463, 464; 252/1

[56] References Cited

U.S. PATENT DOCUMENTS

| | | | |
|---|---|---|---|
| 1,615,515 | 1/1927 | Marwedel | 423/431 |
| 1,634,338 | 7/1927 | Pierce, Jr. | 423/431 |
| 1,697,722 | 1/1929 | Deguide | 423/430 |
| 3,304,155 | 2/1967 | Zirngiebl | 423/431 |
| 3,467,494 | 9/1969 | Posego | 423/431 |
| 3,869,742 | 5/1974 | Simoleit et al. | 423/155 |

FOREIGN PATENT DOCUMENTS 3706533  5/1989  Fed. Rep. of Germany .

*Primary Examiner*—Theodore Morris
*Assistant Examiner*—Edward Squillante
*Attorney, Agent, or Firm*—Foley & Lardner

[57] ABSTRACT

The processing of leaching residues from barium sulfide leaching is described. Sodium sulfide as well as a solid which is useful as an additive for fired clay products, particularly bricks, are obtained as valuable reaction products.

16 Claims, No Drawings

PROCESS FOR PRODUCING AN INORGANIC BARIUM-CONTAINING SOLIDS COMPOSITION

BACKGROUND OF THE INVENTION

This invention relates to a process for producing an inorganic barium-containing solids composition suitable as an additive in fired clay products, the water-insoluble products obtainable according to the invention which can be used as additives for producing fired clay products, their use in the production of fired clay products and the clay products produced using the additives obtainable according to the process of the invention.

Barium sulfide leaching is a process step in the production of barium compounds. The starting material is the naturally-occurring mineral heavy spar (barite). Heavy spar contains approximately 92 to 98% by weight barium sulfate and additionally varying quantities of calcium salts and iron salts and also silicate. The ground heavy spar is mixed with finely ground coal and reduced to barium sulfide at high temperatures (approx. 1,200° C.). The cooled, solidified molten mass containing barium sulfide is extracted with hot water, forming barium sulfide lye. The barium sulfide lye obtained in this barium sulfide leaching is further reacted, for instance to form barium carbonate, which is used in the glass industry.

In barium sulfide leaching, a residue remains. This residue, which, if it is not dried, occurs as a water-containing sludge, contains in addition to some coal predominantly barium salts, and also calcium salts. These are present in particular in the form of carbonates, sulfur compounds and silicates. These leaching residues have hitherto been disposed of. However, this is ecologically undesirable and additionally constitutes a waste of valuable potential raw materials.

A known problem in the production of fired clay products, for instance bricks, is that if the clay and/or other materials, such as mixing water, needed for producing fired clay products contain sulfate, undesired bloom (efflorescence) and discoloration of the fired clay occur. It is already known that the addition of a small quantity of pure barium carbonate prevents the formation of such blooms. The barium carbonate is used in technically pure form, i.e. having a degree of purity of approximately 95% by weight or higher, and is added to the dry or moist clay which has not yet been fired. Production of the barium carbonate with this degree of purity is expensive.

SUMMARY OF THE INVENTION

It is the object of the invention to develop a process which permits the processing of these leaching residues into industrially usable raw materials.

Another object of the invention is to develop a process which converts barium leaching residues to useful material, and minimizes the environmental burden of disposing of such leaching residues.

A further object of the invention is to provide a process and an additive material which can inhibit the occurrence of bloom or efflorescence in fired clay articles.

These and other objects are achieved by providing a process for producing an inorganic, barium-containing solids composition, said process comprising the steps of reacting leaching residues from barium sulfide leaching in an aqueous medium with carbon dioxide, a gas mixture containing carbon dioxide, alkali hydrogen carbonate or alkali carbonate to produce a reaction mixture containing the barium-containing solids composition and an aqueous hydrogen sulfide or alkali sulfide solution, and separating the barium-containing solids composition from said reaction mixture.

According to a further aspect of the invention the objects are achieved by providing a barium-containing solids composition produced by reacting leaching residues from barium sulfide leaching in an aqueous medium with carbon dioxide, a gas mixture containing carbon dioxide, alkali hydrogen carbonate or alkali carbonate to produce a reaction mixture containing the barium-containing solids composition and an aqueous hydrogen sulfide or alkali sulfide solution, and separating the barium-containing solids composition from said reaction mixture.

DETAILED DESCRIPTION OF PREFERRED EMBODIMENTS

According to the invention, the leaching residues from barium sulfide leaching are processed to produce an inorganic barium-containing solids composition suitable as an additive for the production of fired clay products.

The process according to the invention for producing an inorganic, barium-containing solids composition is characterized in that leaching residues from barium sulfide leaching are reacted in an aqueous medium with carbon dioxide, a gas mixture containing carbon dioxide, alkali hydrogen carbonate or alkali carbonate to produce a reaction mixture containing the solids composition and an aqueous hydrogen sulfide or alkali sulfide solution, and the solids composition is separated from the reaction mixture.

It is possible to use pure carbon dioxide or gas mixtures containing carbon dioxide, for instance combustion gases. Advantageously, one starts with alkali carbonate and then obtains a reaction mixture containing the solids composition and an aqueous alkali sulfide solution. The invention will be described in greater detail with reference to this preferred embodiment.

The leaching residues may be used in dry form or as a water-containing sludge, for instance having a water content of up to 50% by weight or more. Since the leaching residues which arise in hydrous form in the leaching process contain water and the reaction of the residues with alkali carbonate is carried out in water, it is not necessary to dry the leaching residues. They are therefore preferably used in the water-containing form in which they occur in the leaching process. The water content of the leaching residues occurring in leaching may vary within a wide range, but is usually between about 30 and 50% by weight, relative to the total weight of the moist residues.

As used herein, the term "alkali carbonate" is understood to refer to carbonates of metals of group I of the periodic table or of ammonium. The same applies to "alkali hydrogen carbonates". Preferably alkali carbonate, particularly sodium carbonate, is used.

The alkali carbonate can be used in solid form or preferably as an aqueous solution. If desired, the alkali carbonate required for the reaction can be produced in situ, for instance by passing carbon dioxide or gases containing carbon dioxide over or introducing it/them into a mixture of the leaching residues and alkali lye. However, it is technically much easier to start from alkali carbonate.

The reaction constituents may be introduced into the reaction mixture in different ways. For instance, dried leaching residues and solid alkali carbonate can be mixed with the desired quantity of water. Part of the desired quantity of water can also be introduced into the reaction mixture in the form of the water contained in the water-containing leaching residue. Furthermore, it is possible to suspend the dry or already water-containing leaching residues in water and thus introduce part or alternatively all of the water into the reaction mixture. Finally, an aqueous alkali carbonate solution may also be used and thus part or alternatively all of the water desired can be introduced into the reaction mixture.

A preferred embodiment of the process according to the invention begins with water-containing leaching residues as occur in the leaching process; a suspension of these leaching residues in water is produced, and the alkali carbonate is used as an aqueous solution.

The water needed for producing the suspension and/or for producing the aqueous alkali carbonate solution can advantageously be fully or partially replaced by filtrates and/or washing solutions which come from preceding reaction mixtures and contain alkali sulfide. The alkali sulfide content of such solutions should be below about 15% by weight. The water consumption in the process according to the invention is considerably reduced by recycling the alkali sulfide solution occurring in the process and/or washing water into subsequent reaction mixtures.

In a preferred embodiment of the process according to the invention, an aqueous suspension of the leaching residues is produced. The water content of this suspension may vary within a wide range, for instance from 30 to 90% by weight water, relative to the total weight of the suspension. Suspensions which have water contents of between 30 and 80% by weight, preferably between 40 and 60% by weight, are technically easy to handle.

Preferably, in addition an aqueous alkali carbonate solution, particularly an aqueous sodium carbonate solution, is used. The alkali carbonate concentration may vary within a wide range, for instance from about 2% by weight up to the saturation limit. Aqueous solutions which contain alkali carbonate in a concentration of approximately 5 to 15% by weight are advantageous.

The reaction of the leaching residues with alkali carbonate is carried out in the presence of water. The water content in the reaction mixture of leaching residues, alkali carbonate and water may vary within a wide range. Advantageously, it is between about 25 and about 90% by weight, relative to the total weight of this reaction mixture. It is of course also possible to operate with a lower water content. However, this is less advantageous in industrial scale operation, as is operation at a greater water content than 90% by weight, which is possible per se. Good results are achieved if the water content is between about 50 and about 70% by weight, relative to the total weight of the reaction mixture.

The invention will be explained in greater detail below using sodium carbonate.

A deficiency of the sodium carbonate can be used, or an excess or a quantity corresponding to the quantity which would be stoichiometrically necessary for converting the barium and calcium compounds contained in the leaching residue into carbonates and the silicon dioxide or silicates present into sodium silicate. Preferably the sodium carbonate is used in a quantity which is 0.5 to 1.5 times the amount which is stoichiometrically required to convert the barium sulfide, barium thiosulfate and barium silicate and also calcium hydroxide contained in the leaching residue into the corresponding carbonates. Particularly preferably, the alkali carbonate is used in an amount which approximates the stoichiometrically required amount.

The reaction of the leaching residues with alkali carbonate can be carried out at temperatures in the range from approximately 15 to 100° C.

The reaction is advantageously carried out until the content of iodometrically determinable reducing substances, particularly reducing sulfur compounds, is less than 3% by weight, preferably between about 0.1 and 2.5% by weight. For determination, samples can be removed regularly and appropriate determination may be carried out.

During the reaction, soluble barium and calcium compounds, particularly sulfur-containing barium compounds, are converted into water-insoluble carbonate. The aqueous solution which is present in addition to the solid contains sodium sulfide and sodium silicate.

Once the reaction has ended, the solids composition is separated from the supernatant solution. For this purpose, known methods, for instance filtering, centrifuging or decanting, may be used.

As already stated, the separated solution contains sodium sulfide and may be concentrated to recover the sodium sulfide. According to a preferred embodiment of the process of the invention, the alkali sulfide solution, optionally after dilution or concentration, may be used completely or partially for producing the suspension of the leaching residues or for producing the alkali carbonate solution.

The separated barium-containing solids composition is a valuable product which is useful as an additive for producing fired clay products and in cement production. For this purpose, it can be used moist or dry. Advantageously, before being used as such an additive, the solids composition is washed one or more times with sulfide-free water and dried. The used washing solutions produced thereby may be entirely or partially recycled to the process for producing the aqueous suspension or the alkali carbonate solution.

The invention further relates to the use of the inorganic, barium-containing solids composition obtainable in the process according to the invention as an additive for the production of fired clay products. Surprisingly, it has been found that the solids composition obtainable according to the process of the invention represents an advantageous additive for the production of fired clay products.

The solids compositions produced by the leaching residue treatment process of the present invention can be used as additives for producing fired clay products which additives are substantially chloride-free and have an iodometrically determinable content of reducing impurities, particularly sulfur compounds, of less than about 3% by weight. Preferably the reducing impurity content is less than about 2.5% by weight, for instance between 0.1 and 2.5% by weight, relative to the dry substance.

Their content of barium compounds which are soluble in hydrochloric acid is advantageously between about 15 and about 90% by weight, preferably between about 35 and about 70% by weight, and particularly preferably between about 40 and about 50% by weight, expressed as barium carbonate. These barium compounds which are soluble in hydrochloric acid comprise barium carbonate and barium silicate.

It is known that reducing substances contained in the clay additive render part of the barium carbonate present inactive in preventing efflorescence. It is believed that approximately 6% by weight of the barium carbonate present becomes inactive per 1% by weight of reducing substances in the clay additive. If, for instance, a clay additive contains 2% by weight reducing substances and 45% by weight barium carbonate, approximately 33% by weight active barium carbonate is present.

It is advantageous if the additive according to the invention contains such a quantity of barium compounds which are soluble in hydrochloric acid and are expressed as barium carbonate that, taking into account the content of reducing compounds, the content of effectively active barium compounds is greater than about 20% by weight, and preferably greater than about 30% by weight, relative to the dry substance of the clay additive.

If an additive is desired which should have a particular barium carbonate content, it is possible to adjust this particular content by adding barium carbonate to a solids composition obtained according to the invention with a lower than desired barium carbonate content or alternatively by adding suitable additives, for instance clay or $CaCO_3$, to a solids composition obtained according to the invention having a higher than desired barium carbonate content. If desired, however, it is also possible to perform the leaching of barium sulfide in such a manner that leaching residues with the desired barium content are produced.

A particularly outstanding additive is obtained if the leaching residues are reacted with a quantity of sodium carbonate which corresponds approximately to the amount stoichiometrically required for the conversion of the barium sulfide, barium thiosulfate, barium silicate and calcium hydroxide contained in the leaching residue into the corresponding carbonates. The resulting solids composition has outstanding properties after washing and drying. Its activity in preventing the formation of blooms upon firing of clay is very good, the composition is free-flowing, can be metered readily, can be stored readily in silos and is easy to transport. The inert constituents contained in this solids composition in addition to barium carbonate are suitable as clay additives. Since the solids composition is chloride-free, it is also non-corrosive.

The suitability of the solids compositions produced by processing leaching residues according to the invention as clay additives is surprising. The solids composition obtained in the process of the invention differs in its barium content only very slightly from the leaching residues used for its production. However, the untreated leaching residues are completely unsuitable as clay additives. It is only the process according to the invention which converts the unusable residues into valuable products.

Thus one aspect of the invention also relates to the use of the solids composition produced by the process according to the invention as an additive for the production of fired clay products. It is particularly suitable for use with sulfate-containing clays, and is added to the moist or dry clays in a quantity of 0.1 to 10% by weight, relative to the dry substance of the clay. A person skilled in the art can, if necessary, easily determine the quantity of the additive according to the invention which is to be added for particular clays by means of simple preliminary tests.

The fired clay products are produced in the known manner. In principle, any sulfate-containing clays can be mixed in the moist or dry state with the moist, but preferably with the dry, additive. Conventional additives, for instance lean materials such as sand, alumina or fired clays, water, fluxing agents such as feldspar or iron oxides or colorants may also be added. The resulting clay mixtures are dried and fired as usual. The firing temperature is in the usual range, usually between 900° C. and 2000° C. In the lower portion of the temperature range, earthenware is obtained, including bricks, and in the upper portion of the temperature range sinterware, also called impermeable earthenware, is obtained.

The fired clay products produced using the clay additive according to the invention, in particular bricks, roof tiles, floor tiles or flowerpots, are likewise subjects of the invention.

The process according to the invention thus makes it possible to reduce considerably or completely the quantity of leaching residues from barium sulfide leaching which have to be disposed of and yields valuable products with surprising advantageous properties.

The following examples are intended to explain the invention in greater detail, but without limiting its scope.

EXAMPLES

Example 1

Processing of the leaching residues from barium sulfide leaching

A leaching residue produced during barium sulfide leaching was used having the analysis data given in Table 1, in the column headed "Leaching Residue". This leaching residue was not dried, but used in water-containing form. The total weight of the leaching residue used was 1,538 kg, with 538 kg being allotted to the water contained therein.

This moist, sludge-like leaching residue was suspended in 766 kg of an aqueous sodium sulfide solution. This solution ($Na_2S$ content approximately 3.6% by weight) was derived from washing solutions and filtrates of earlier process mixtures.

613 kg of an aqueous solution which contained sodium carbonate in a concentration of approximately 13.9% by weight were added to the suspended leaching residue. Likewise, parts of washing solutions and filtrates derived from earlier process mixtures were used for producing this sodium carbonate solution.

The reaction mixture of leaching residues, water and sodium carbonate was then kept at a temperature of approximately 45° C. for about one hour while mixing it thoroughly using a stirrer. Then the solids were filtered from the supernatant solution, washed twice with 766 kg portions of sulfide-free water and filtered. Then the washed solid was dried. Yield: 1000 kg.

The resulting filtrates and washing solutions were combined and partly recycled for suspending the leaching residue and producing the sodium carbonate solution for further process mixtures, while the remaining part of the combined filtrates was dried to obtain the sodium sulfide contained therein. Sodium sulfide is a valuable product and is used for instance in the tanning industry.

The solid obtained after washing twice and drying occurred as a substantially chloride-free, freely flowing powder. The density of this substance was 3.33 g/cm³ and the bulk density 0.59 g/cm³. Additional analysis data of the solid are compiled in Table 1, in the column headed "Additive According to Invention".

TABLE 1

Analysis of Leaching Residues and Resulting Additive

|  | Analysis Method | Leaching Residue | Additive According to Invention[1] |
|---|---|---|---|
| water-soluble barium | gravimetric | 10 | 5 |
| barium soluble in HCl[2] | gravimetric | 43 | 45 |
| water-soluble and water-insoluble reducing substances | iodometric | 5 | 2 |
| resulting $H_2S$ and $SO_2$ | absorption in iodine | 2 | 0.6 |
| inert substances[3] = remainder to 100% by weight | | | |

[1] Given in % by weight, relative to the total weight of the dry substance.
[2] Expressed as $BaCO_3$
[3] $SiO_2$, $CaCO_3$, $BaSO_4$, carbon, water

Example 2

Use of the solid produced in Example 1 as an additive for dried clays for producing fired clay products

General experimental method

A commercially available clay (obtained from Cotto Toscano, San Quirico, Dorcia, Siena, Italy) which contained 12.6% by weight water was used. This clay also contained a total of 0.75% by weight sulfur, of which 0.25% by weight (calculated as $SO_3$) was soluble sulfate and 0.49% by weight (calculated as $SO_3$) was pyritic sulfur.

The moist clay was first dried for 24 hours at 110° C., then ground and sieved. The fraction having particle diameters of less than 0.5 mm was used. 100 g portions of this resulting dried clay fraction were each mixed with various quantities of the additive produced in Example 1. After mixing, 20 g water were added (this is the quantity of water recommended by brick manufacturers). A cube of approximately 100 g was formed from the hydrous mixture and was dried at 80° C. for 24 hours after forming. The dried cubes were then each fired as follows:

The temperature of the cubes was increased slowly and uniformly from about 30° C. to 1,050° C. over 17 hours. Once this temperature was achieved, the cubes were held at this temperature for one hour and then slowly and uniformly brought from 1,050° C. to 150° C. over 15 hours. Then the cubes were removed from the kiln and evaluated with respect to the efflorescence which could be observed. The product with the greatest efflorescence observed was assessed as "xxxxxx", and products having less efflorescence in each case as "xxxxx", "xxxx" etc. Products in which no visible efflorescence could be detected were assessed as "o".

In the series of tests 2.1 to 2.6, the additive obtained in Example 1 was added to the dried clays in different quantities. Test 2.7 is a comparison test in which the clay had been fired without additive, but otherwise similarly to test series 2.1 to 2.6. The amounts of additive used in the test series 2.1 to 2.6 and also the estimated efflorescence observed are listed in Table 2 together with the result of the comparison test 2.7.

TABLE 2

Additive Amounts and Observed Efflorescence of Fired Clays

| Test No. | Amount of additive (g 100 g dry clay) | Estimated Efflorescence |
|---|---|---|
| 2.1 | 0.5 | xxxx |
| 2.2 | 0.75 | xxx |
| 2.3 | 1.00 | xx |
| 2.4 | 1.25 | x |
| 2.5 | 1.50 | x |
| 2.6 | 1.75 | o |
| Comparison example 2.7 | — | xxxxx |

It is apparent from Table 2 that efflorescence is no longer observed upon addition of as little as 1.75 g additive per 100 g dry clay substance.

Example 3

Use of the additive according to the invention in the production of fired clay products by admixing it with moist clay The additive produced in Example 1 and the clay described in Example 2 were used. However, this time the clay was not dried, but mixed with the additive in the moist state, i.e. with about 12.6% by weight water. From then on, Example 3 was performed analogously to Example 2.

Two tests 3.1 and 3.2 were carried out with different quantities of additive used. The quantities used and the evaluated efflorescence of the fired cubes are listed in Table 3. Table 3 also shows the result of a comparison test 3.3 which was carried out analogously to tests 3.1 and 3.2, but without incorporation of any additive.

TABLE 3

Additive Amounts and Observed Efflorescence of Fired Clays

| Test No. | Amount of Additive (g/100 g dry clay) | Estimated Efflorescence |
|---|---|---|
| 3.1 | 1.00 | 0 |
| 3.2 | 2.00 | 0 |
| Comparison Example 3.3 | — | xxxxxx |

Table 3 shows that when moist clay is used the effect of the additive according to the invention is particularly obvious.

Example 4

Example 1 was repeated. This time, the proportion of the filtrates and washing solutions obtained which was not recycled for suspending the leaching residue and for producing the sodium carbonate solution was converted by concentration into an aqueous sodium sulfide solution which contained approximately 60% by weight sodium sulfide.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for producing an inorganic, barium-containing solids composition, said process comprising the steps of reacting at a temperature in the range from 15° to 100° C. in an aqueous medium
   a) leaching residues from barium sulfide leaching and
   b) carbon dioxide, a gas mixture containing carbon dioxide, alkali hydrogen carbonate or alkali carbonate
   to produce a reaction mixture containing the barium-containing solids composition and an aqueous hydrogen sulfide or alkali sulfide solution, and
separating the barium-containing solids composition from said reaction mixture.

2. A process according to claim 1, wherein the leaching residues are used in the form of a suspension in water.

3. A process according to claim 2, wherein the aqueous sulfide solution obtained after separating the solids composition or the washing water obtained after washing the solids composition is recycled to produce said suspension of leaching residues.

4. A process according to claim 1, wherein the leaching residues are reacted with an alkali carbonate.

5. A process according to claim 4, wherein said alkali carbonate is sodium carbonate.

6. A process according to claim 4, wherein said alkali carbonate is in the form of an aqueous solution.

7. A process according to claim 6, wherein said aqueous solution contains from about 5 to about 15% by weight of said alkali carbonate.

8. A process according to claim 6, wherein the aqueous sulfide solution obtained after separating the solids composition or the washing water obtained after washing the solids composition is recycled to produce an aqueous alkali carbonate solution for reaction with said leaching residues.

9. A process according to claim 1, wherein said leaching residue is reacted with from 0.5 to 1.5 times the amount of alkali carbonate stoichiometrically required to convert all barium sulfide, barium thiosulfate, barium silicate and calcium hydroxide contained in said leaching residue into barium carbonate and calcium carbonate.

10. A process according to claim 1, further comprising washing said separated solids composition at least once with water.

11. A process according to claim 1, further comprising drying said separated solids composition.

12. A process according to claim 1, further comprising adjusting the barium carbonate content of said separated solids composition to between about 15 and about 90% by weight, relative to the dry substance.

13. A process according to claim 12, wherein calcium carbonate is added to adjust the barium carbonate content of said separated solids composition.

14. A process according to claim 12, wherein the barium carbonate content of said separated solids composition is adjusted to between about 40 and 50% by weight, relative to the dry substance.

15. A process according to claim 12, wherein barium carbonate is added to adjust the barium carbonate content of said separated solids composition.

16. A process according to claim 12, wherein clay is added to adjust the barium carbonate content of said separated solids composition.

* * * * *